Oct. 20, 1931.                C. W. H. JOHNSTON                1,828,145
              APPARATUS FOR BRACING VEHICLES IN FREIGHT CARS
                    Filed Nov. 13, 1930         2 Sheets-Sheet 1

Inventor
Clarence W. H. Johnston
By Jack A. Ashley
Attorney

Oct. 20, 1931.   C. W. H. JOHNSTON   1,828,145
APPARATUS FOR BRACING VEHICLES IN FREIGHT CARS
Filed Nov. 13, 1930   2 Sheets-Sheet 2
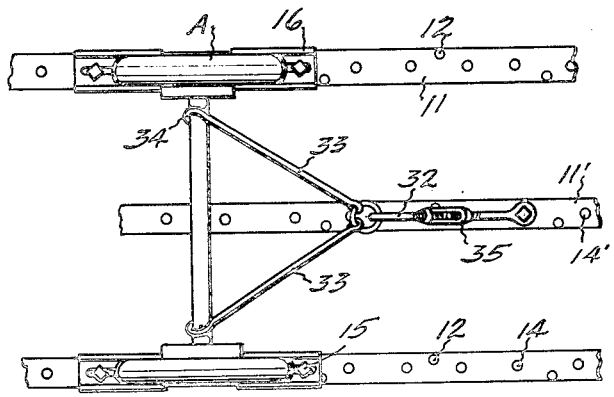
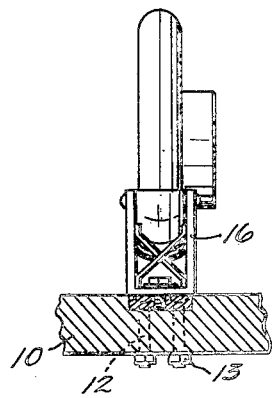
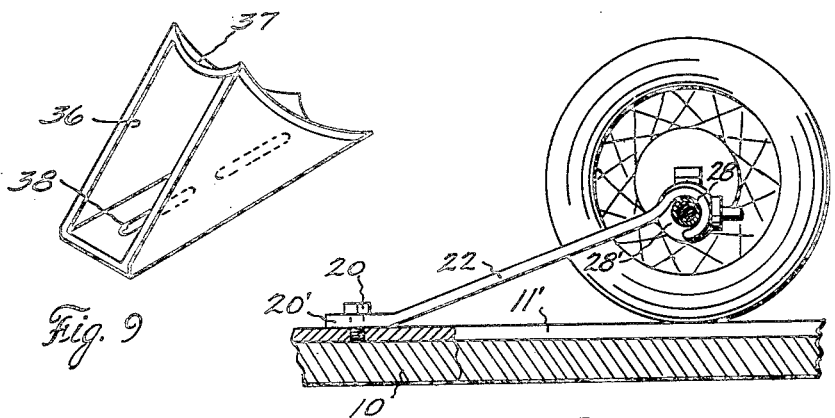
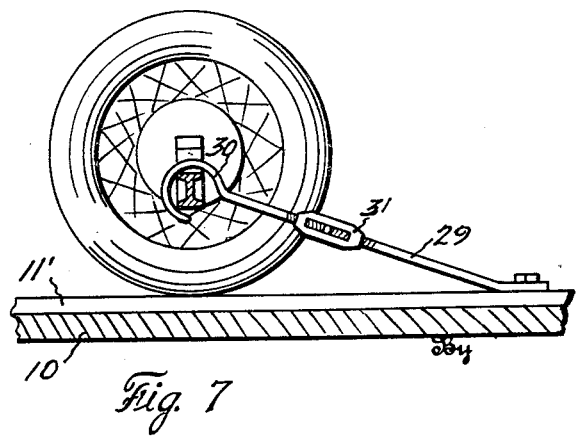
Inventor
Clarence W. H. Johnston Patented Oct. 20, 1931

1,828,145

UNITED STATES PATENT OFFICE

CLARENCE W. H. JOHNSTON, OF DALLAS, TEXAS

APPARATUS FOR BRACING VEHICLES IN FREIGHT CARS

Application filed November 13, 1930. Serial No. 495,332.

This invention relates to new and useful improvements in apparatuses for bracing vehicles in freight cars.

One object of the invention is to provide improved means for securely bracing vehicles to the floors of freight cars, whereby the vehicles are rigidly and securely anchored against movement with relation to the freight car during transportation.

Another object of the invention is to provide adjustable chocks which may be quickly and easily secured in position for bracing the wheels of the vehicle, together with anchor rods at opposite ends of the vehicle, whereby said vehicle is rigidly and firmly secured to the floor of the freight car.

An important object of the invention is to provide means for securing the apparatus to means imbedded in the floor of the freight car and occupying a minimum amount of space, whereby the floor of the freight car is not damaged by the use of the bracing apparatus and the freight car is not limited to the transportation of vehicles.

A further object of the invention is to provide an adjustable chock having a swinging saddle, whereby the saddle will automatically adjust itself to tires of variable circumferences and sizes.

A construction designed to carry out the invention will be hereinafter described together with other features of the invention.

Figure 1:
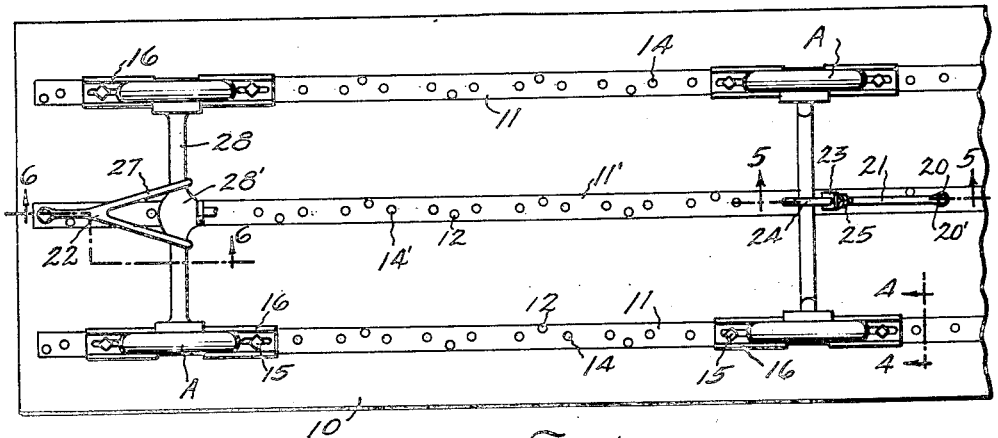
Figure 2:
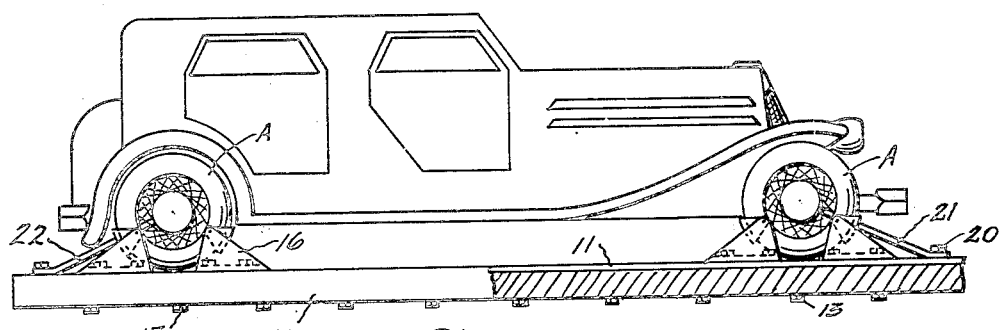
Figures 3, 5:
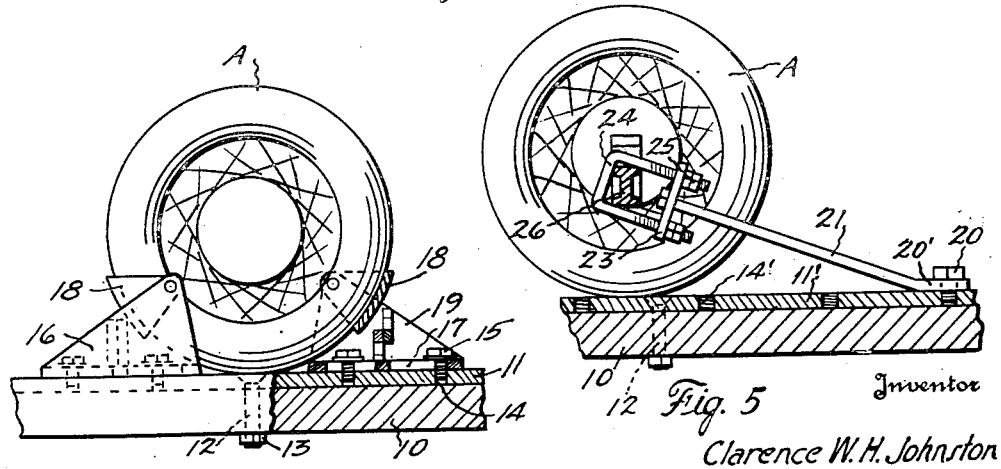

The invention will be more readily understood from a reading of the following specification and by reference to the accompanying drawings in which an example of the invention is shown, and wherein:

Figure 1 is a partial plan view of a freight car equipped with apparatus constructed in accordance with the invention and appiled to the wheels and axle of a vehicle, Figure 2 is a side elevation of the same, Figure 3 is a view partly in elevation and partly in section showing the adjustable chocks secured in position for bracing the wheels of the vehicle, Figure 4 is a vertical sectional view taken on the line 4—4 of Figure 1, Figure 5 is a vertical sectional view taken on the line 5—5 of Figure 1, and showing an adjustable anchor rod connected to one end of the vehicle, Figure 6 is a vertical sectional view taken on the line 6—6 of Figure 1 and showing a non-adjustable anchor rod hooked over the rear axle of the vehicle, Figures 7 and 8 are views showing alternate forms of anchor rods, and Figure 9 is a perspective view of an alternate form of chock.

In the drawings the numeral 10 designates the floor of a freight car or other suitable transporting medium. A plurality of longitudinal metal strips 11 are embedded in the floor 10 so as to be substantially flush therewith. These strips are secured in the floor by countersunk bolts 12 which extend through the floor 10 and receive nuts 13. The two outer strips are spaced apart the wheel width of the vehicles to be transported, whereby the wheels A of said vehicles may be centered longitudinally of the strips, while the third or center strip 11' is positioned intermediate the two outer strips so as to be beneath the longitudinal center of the vehicle.

The strips are provided throughout their length with a plurality of screw-threaded openings 14 for receiving adjusting bolts 15 of wheel chocks 16. Each chock has two adjusting bolts which extend through slots 17 in the base thereof. An adjustable saddle 18 is pivoted between upright side members 19 of the chock, whereby the saddle will automatically adjust itself to wheels of various circumferences. It is pointed out that the saddles of the chocks contact with the wheels A at sufficient height from the floor 10 to overcome any possibility of a sudden lurch or movement of the freight car creating sufficient inertia to cause the wheels to ride over the chocks.

The center strip 11' is also provided throughout its length with a plurality of screw-threaded openings 14' for receiving adjusting bolts 20 mounted in eyes 20' in one of the ends of anchor rods or ties 21 and 22. These rods are connected at inclinations between the strip and the opposite ends of the vehicle. As shown in Figures 1 and 5 the anchor rod 21 is provided with a transverse bar 23 which has its opposite ends adjustably secured on the screw-threaded ends of a yoke 24 by nuts 25. The yoke is mounted over the front axle 26 of the vehicle and by adjusting the nuts 25 on the yoke 24 any slack between the bolt 20 and the axle 26 may be taken up.

As shown in Figures 1 and 6, the rod 22 is split, forming diverging fingers 27, the ends of which are hooked for engaging over the rear axle 28 of the vehicle on opposite sides of the differential housing 28'. The rod 22 is non-adjustable in length and provides a rigid connection between the strip 11' of the vehicle, while the rod 21 is adjustable in length and as before stated the rod may be varied in length to correspond with any variance in distance between the axle 26 and the opening in which the bolt 20 is secured.

In using the apparatus the anchor rod 22 is first hooked over the rear axle 28 and secured to the strip 11' by the bolt 20. Then the anchor rod 21 is connected between the front axle 26 and the strip 11' and by adjusting the nuts 25 any slack between the bolt 20 of the rod 22 and the bolt 20' of the rod 21 is taken up, thereby rigidly anchoring the vehicle at its opposite ends. The chocks 16 are then applied to opposite sides of the wheels A and secured in position by the bolts 15. The vehicles are then ready for transportation.

It is pointed out that the inclined anchor rod connections between the strip 11' and the axles of the vehicle, together with the wheel bracing chocks, will securely and rigidly hold the vehicles against movement with relation to the freight car during transportation. Also, the structure and application of the anchor rods and chocks are such that they may be quickly, easily and conveniently applied to the vehicle and secured in position. Furthermore, as the strips 11 and 11' occupy very little floor space and are flush with the floor of the freight car the same is not limited to use in transporting vehicles.

In Figure 7 I show an alternate form of adjustable anchor rod 29 comprising a hooked end 30 for engaging over the axle of the vehicle and a turnbuckle adjustment 31 for varying the length of the rods.

In Figure 8 I show still another alternate form of anchor rod 32 comprising links 33 connected at one end of the rod and having hooked ends 34 for engaging over opposite ends of the axle of the vehicle. The rod is provided with a turnbuckle adjustment 35 for varying its length.

In Figure 9 I show an alternate form of chock 36. This form of chock has a fixed saddle 37 for receiving wheels of the same circumference. Slots 38 are provided in the base of the chock for receiving the usual hold down bolts.

Various changes in the size and shape of the different parts, as well as modifications and alterations, may be made within the scope of the appended claims.

Having illustrated and described preferred forms of the invention, what I claim, is:

1. In an apparatus for bracing vehicles in freight cars, a pair of longitudinal strips and an intermediate longitudinal strip, said strips being adapted to be secured to the floor of a car, ties mounted on the intermediate strip for engaging the axles of the vehicle, and chocks adjustably mounted on the outer strips for engaging the wheels of the vehicle after the vehicle is secured by said ties whereby said vehicle is held in position.

2. In an apparatus for bracing vehicles in freight cars, a pair of longitudinal strips and an intermediate longitudinal strip, said strips being adapted to be secured to the floor of a car, ties mounted in divergent relationship with respect to each other on the intermediate strip for engaging the axles of the vehicle, and chocks adjustably mounted on the outer strips for engaging the wheels of the vehicle after the vehicle is secured by said ties whereby said vehicle is held in position.

3. In an apparatus for holding vehicles, chocks for engaging the wheels of the vehicle, and curved saddles pivoted to the chocks within the radius of curvature of the saddles whereby the saddles are automatically adjusted to wheels of varying sizes.

4. An apparatus for bracing vehicles in freight cars as set forth in claim 1, with one of the ties having means for adjusting longitudinally, whereby slack between the axles and the ties may be taken up.

5. In an apparatus for bracing vehicles in freight cars, a pair of longitudinal strips and an intermediate longitudinal strip, said strips being adapted to be secured to the floor of a car, diverging anchor rods mounted on the intermediate strip for engaging the axles of the vehicle, one of said rods having means for adjusting longitudinally, whereby slack between the rods and the axles may be taken up, and chocks adjustably mounted on the strips for holding the wheels of the vehicle after the vehicle has been secured by said ties, and said chocks having curved saddles pivoted thereto within the radius of curvature of the saddle so as to automatically adjust themselves for receiving wheels of varying diameters.

In testimony whereof I affix my signature.

CLARENCE W. H. JOHNSTON.